US009437884B2

(12) United States Patent
Kolodziej

(10) Patent No.: US 9,437,884 B2

(45) Date of Patent: Sep. 6, 2016

(54) SELF-TUNING THERMAL CONTROL OF AN AUTOMOTIVE FUEL CELL PROPULSION SYSTEM

(75) Inventor: Jason R. Kolodziej, West Henrietta, NY (US)

(73) Assignee: GM Global Technology Operations LLC, Detroit, MI (US)

(*) Notice: Subject to any disclaimer, the term of this patent is extended or adjusted under 35 U.S.C. 154(b) by 2596 days.

(21) Appl. No.: 12/119,686

(22) Filed: May 13, 2008

(65) Prior Publication Data

US 2009/0286111 A1 Nov. 19, 2009

(51) Int. Cl.
*H01M 8/04* (2016.01)
*H01M 8/10* (2016.01)

(52) U.S. Cl.
CPC ..... *H01M 8/04007* (2013.01); *H01M 8/04358* (2013.01); *H01M 8/04679* (2013.01); *H01M 8/04723* (2013.01); *H01M 8/04768* (2013.01); *H01M 2008/1095* (2013.01); *Y02E 60/50* (2013.01)

(58) Field of Classification Search
USPC .......................................... 429/433–442, 512
See application file for complete search history.

(56) References Cited

U.S. PATENT DOCUMENTS 4,768,143 A * 8/1988 Lane .................... G05B 13/044 700/37
4,814,968 A * 3/1989 Fukumoto ............ G05B 13/042 700/30
6,026,793 A * 2/2000 Yasui .................. F02D 41/1402 123/674
6,651,761 B1 11/2003 Hrovat et al.
2003/0065438 A1* 4/2003 Katoh ........................... 701/104
2003/0205989 A1* 11/2003 Garrigan et al. ............... 322/28
2004/0144340 A1* 7/2004 Kilger ..................... F01P 7/164 123/41.1
2005/0216175 A1* 9/2005 Takahashi et al. ........... 701/109
2006/0063048 A1* 3/2006 Kolodziej ........................ 429/24
2007/0065694 A1* 3/2007 Maier et al. .................... 429/24

* cited by examiner

*Primary Examiner* — Jonathan Crepeau
*Assistant Examiner* — Jacob Buchanan
(74) *Attorney, Agent, or Firm* — John A. Miller; Miller IP Group, PLC

(57) ABSTRACT

A fuel cell system that employs an on-line self-tuning algorithm that provides temperature control of a fuel cell stack in response to disturbances on the system. The system includes a thermal sub-system having a cooling fluid pump that pumps a cooling fluid through the fuel cell stack, a temperature sensor that measures the temperature of the cooling fluid out of the stack, a radiator that cooling the cooling fluid from the fuel cell stack and a by-pass valve that selectively controls how much of the cooling fluid flows through the radiator or by-passes the radiator. A controller controls the position of the by-pass valve in response to a temperature signal from the temperature sensor. The controller calculates a plurality of variables and a dead-time value, and determines whether the dead-time value should be increased, decreased or kept the same based on an estimate of a dead-time plant model.

13 Claims, 1 Drawing Sheet

40
52
PLANT MODEL ESTIMATE
50
DEAD TIME ESTIMATE
42
44
DEAD BEAT CONTROLLER
FUEL CELL PLANT
46
48

SELF-TUNING THERMAL CONTROL OF AN AUTOMOTIVE FUEL CELL PROPULSION SYSTEM

BACKGROUND OF THE INVENTION

1. Field of the Invention

This invention relates generally to a fuel cell system including a thermal sub-system that controls the temperature of a fuel cell stack and, more particularly, to a fuel cell system including a thermal sub-system that employs an on-line self-tuning control algorithm that controls the temperature of a fuel cell stack in response to system disturbances during operation.

2. Discussion of the Related Art

Hydrogen is a very attractive fuel because it is clean and can be used to efficiently produce electricity in a fuel cell. A hydrogen fuel cell is an electrochemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack.

Various components in the fuel cell stack, such as the membranes, may be damaged if the temperature of the stack increases above a certain materials transition temperature, such as 85° C. A fuel cell system typically includes a thermal sub-system for maintaining the fuel cell stack at a desired operating temperature. The thermal sub-system typically includes a pump that pumps a cooling fluid through a coolant loop outside of the stack and cooling fluid flow channels provided within the bipolar plates. A radiator typically cools the hot cooling fluid that exits the stack before it is sent back to the stack.

It is known that precise relative humidity (RH) control is required for fuel cell stack performance and durability. One of the primary control parameters for RH is temperature. In order to accurately control the cooling fluid temperature, and thereby stack temperature, many factors need to be considered. A few of the known variables are radiator size and performance, cooling fluid type and stack size. However, there are many parameters that are unknown that should be treated as disturbances, such as ambient temperature, vehicle speed, stack power request and actuator dynamics. The problem with a fixed-gain controller is that they can only be tuned for one operating condition. When the conditions vary as much as they do in an automotive environment, a fixed-gain controller is typically inadequate.

SUMMARY OF THE INVENTION

In accordance with the teachings of the present invention, a fuel cell system is disclosed that employs an on-line self-tuning algorithm that provides temperature control of a fuel cell stack in response to disturbances on the fuel cell system. The fuel cell system includes a thermal sub-system having a cooling fluid pump that pumps a cooling fluid through the fuel cell stack, a temperature sensor that measures the temperature of the cooling fluid out of the stack, a radiator that cooling the cooling fluid from the fuel cell stack and a by-pass valve that selectively controls how much of the cooling fluid flows through the radiator or by-passes the radiator. A controller controls the position of the by-pass valve in response to a temperature signal from the temperature sensor. The controller calculates a plurality of variables and a dead-time value, and determines whether the dead-time value should be increased, decreased or kept the same based on an estimate of a dead-time plant model. In one non-limiting embodiment, the controller uses a first-order plus dead-time current model in combination with a recursive least squares process.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for on-line tuning of temperature control for a fuel cell stack is merely exemplary in nature, and is in no way intended to limit the invention or its applications or uses.

Figure 1:
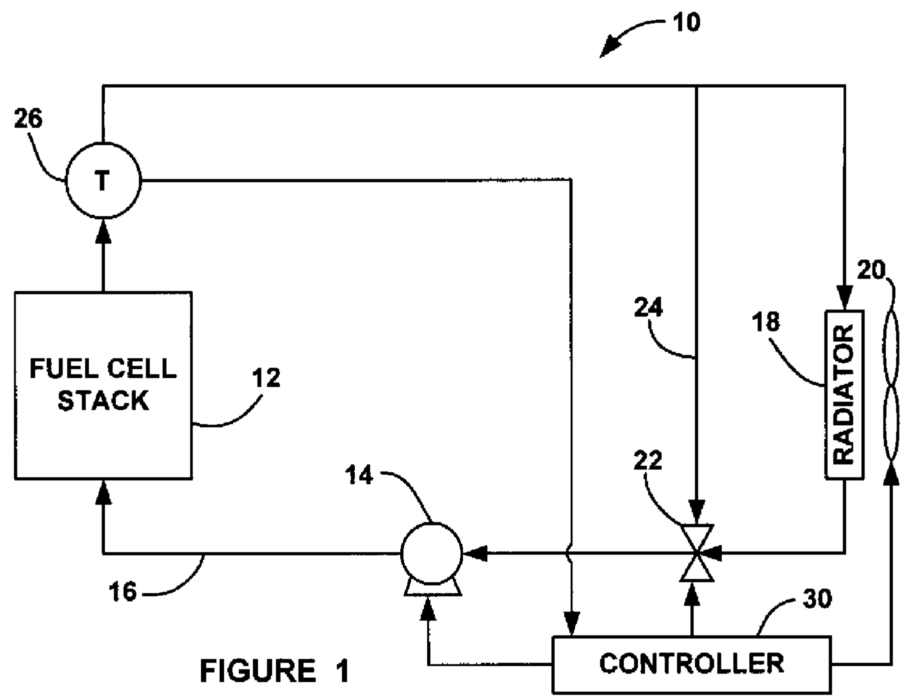
FIG. 1 is a block diagram plan view of a fuel cell system employing a thermal sub-system.

FIG. 1 is a block diagram of a fuel cell system 10 including a fuel cell stack 12. The fuel cell system 10 also includes a thermal sub-system having a pump 14 that pumps a cooling fluid through a cooling fluid line 16 and the fuel cell stack 12. The heated cooling fluid that exits the fuel cell stack 12 is sent to a radiator 18 where it is cooled before being returned to the fuel cell stack 12. A fan 20 forces air through the radiator 18 to provide additional cooling, where the speed of the fan 20 can be controlled to provide the desired cooling. A by-pass valve 22 is provided in the cooling fluid line 16 that allows a controlled portion of the cooling fluid to by-pass the radiator 20 on by-pass line 24, as desired. In one non-limiting embodiment, the by-pass valve 22 is an electrically-heated, wax thermostat by-pass valve. A temperature sensor 26 measures the temperature of the cooling fluid exiting the stack 12. A controller 30 controls the speed of the pump 14, the position of the by-pass valve 22 and the speed of the fan 20 in response to a temperature signal from the temperature sensor 26 and other inputs. As will be discussed in detail below, the controller 30 employs an algorithm that controls the temperature of the stack 12 by controlling the position of the by-pass valve 22 in response to disturbances during normal operation of the fuel cell system 10.

The disturbances can be summed up as follows. The vehicle speed request results in a power request to the fuel cell system, and includes disturbances from acceleration, grade, etc. all of which affect the power request. For ambient temperature, automotive applications typically target −22° F. to 104° F. This temperature variation drastically changes the performance of the radiator 18 along with the convective heat transfer from the thermal sub-system. The speed of the fan 20 and the ram airflow through the radiator 18 provides thermal sub-system disturbances, where the fan speed is a controlled actuator and can aid the radiator in cooling. The ram airflow is a major disturbance to the radiator 18. High speed on level ground is much different than towing at low speed up a grade, even if the power request to the fuel cell stack 12 is the same. Standard integral combustion engine coolant valves typically use a wax thermostat for temperature regulation because of its long-term durability, reliability, and low cost. Fuel cell thermal control requires a high degree of accuracy. The solution is an electrically heated wax thermostat.

As mentioned above, it is known that in order to maintain optimum performance from a fuel cell stack, accurate water management is critical. If the RH of the stack 12 is too high, such as greater than 100%, water droplets will form within the stack flow channels that could result in flooding and ultimately gas starvation. Without the proper gas flow, the desired reaction does not occur and performance suffers. On the other hand, if the RH is too low, the membranes within the fuel cells do not become sufficiently humidified resulting in high ohmic losses and reduced performance. Current PEM fuel cell stack membranes typically require an RH of 80%-100% for optimum performance. Such a relationship for RH can be shown by:

$$RH = \frac{P_w}{P_{sat}} \quad (1)$$

Where $P_w$ is the water partial pressure and $P_{sat}$ is the saturation vapor pressure.

It is known that the water partial pressure $P_w$ is simply the mole fraction of water vapor in the gas stream. The sum of all the constituent partial pressures equals the total absolute pressure. Concentration partial pressure is dependent on temperature, however, the saturation vapor pressure depends strongly on temperature, i.e., $P_{sat}$=f(T). Thus, it is easy to understand from the RH calculation in equation (1) that for a fixed amount of water vapor, raising the pressure increases the RH and raising the temperature decreases the RH.

The following example illustrates the strong temperature dependence. For air at an RH=70% at T=20° C., yields a water partial pressure of $P_w$=1.64 kPa. Assuming the air pressure and gas constituent's remains constant, but the temperature raises to 60° C., the RH falls drastically to 8%. For typical fuel cell operating conditions, a 10° C. increase in temperature can decrease the RH by 24% into a severe drying condition, or a 10° C. decrease would raise the relative humidity 39% to 109%, well into the region of liquid water formation leading to channel flooding and eventual fuel cell stack performance degradation.

The above example illustrates the need for accurate thermal control in the fuel cell system 10. However, the large number of unknown variables in the system 10 makes this a very challenging problem. Standard fixed gain control, such as proportional-integral-derivative (PID) control, can be calibrated for a given operating condition and performs quite well. However, as the operating conditions of the system 10 inevitably changes, the optimality of this control degrades quickly. A solution to this problem is the gain schedule in the controller for multiplying operating regions. However, it becomes very time consuming to cover several operating points, it takes critical memory space on an already limited automotive controller, and it still may not perform optimally in all conditions. Therefore, the present invention provides a self-tuning or adaptive control scheme during operation of the fuel cell system 10 to address this problem.

The present invention proposes an adaptive thermal management control scheme that assumes a model of the system and uses on-line data measurements to identify the parameters that make the model fit the measurement. With an appropriate mathematical representation of the system, it is possible to apply a number of control theories, such as minimum variance or dead-beat. In fact, if tuning rules for a calibrated PID control utilize model information, these parameters can simply be updated as new model parameters are identified. There are a number of real-time identification methods that can be used to identify unknown model parameters. The most popular, and the one used by the present invention in a non-limiting embodiment, is referred to as recursive least squares (RLS). RLS has successfully been applied to identify numerous on-line systems.

As discussed above, there are three actuators in the thermal sub-system, namely the pump 14, the by-pass valve 22 and the fan 20. The temperature to be controlled is the temperature of the cooling fluid at the outlet of the fuel cell stack 12 as measured by the temperature sensor 26. This temperature approximates the temperature of the fuel cell stack 12. When cathode air enters the fuel cell stack 12 it quickly equilibrates with the temperature of the stack 12. Obviously it is not reasonable to control the stack cooling fluid outlet temperature with the fan 20. A change in fan speed would take far too long to have an affect on the temperature of the cooling fluid exiting the stack 12. Controlling the cooling fluid pump 14 is a possibility, but through a relative gain analysis, flow is much more effective to control the temperature rise through the stack 12. Thus, the remaining control actuator is the by-pass valve 22. A multi-input, multi-output control scheme using all three actuators would meet with the best result, but these types of control approaches are very advanced and often difficult to develop, especially for systems that are not well instrumented. Automotive applications typically are very sparsely instrumented due to cost reasons. For a given operating condition, a standard PID controller can be tuned with adequate results using an electrically-heated, wax thermostat by-pass valve to maintain a desired coolant outlet temperature. However, when the operating conditions change, the gains selected for the PID controller will quickly become sub-optimal. The present invention employs the same actuator-measurement combination, but utilizes self-tuning adaptive control theory to significantly improve control over operating regions without the need of recalibration.

Standard calibration practice for the thermal sub-system system involves step changing the by-pass valve position command and measuring the resulting cooling fluid temperature for a fixed fuel cell power and fitting the data to a first-order plus dead-time (FOPDT) model. A fixed fuel cell power can be thought of as driving a vehicle on flat ground at a constant speed and ambient temperature. The fan speed and pump speed would also be constant. Therefore, the airflow through the radiator 18 would be constant and the pump flow would be maintaining a fixed temperature rise.

An easy relation for temperature rise in the fuel cell stack 12 can be given by $P=\dot{m}*Cp*DT$, where P is a result of the heat transferred to the cooling fluid from the fuel cell stack 12, and can loosely be approximated to the power output of the stack 12, the variable $\dot{m}$ is the mass flow of the cooling fluid through the stack 12, Cp is the specific heat of the cooling fluid and DT is the temperature rise in the stack 12. Therefore, if it is desired to have a 10° temperature rise in the stack 12 for a given power request, it is easy to set the flow to achieve this goal. Obviously there is a strong dependence between pump speed and cooling fluid outlet temperature. Fixing the pump speed alleviates this problem for the calibration portion of the modeling, but the interaction still remains very strong during operation.

It is straight forward to see that many variables are required to be fixed for the modeling to be successful. However parameters typically vary greatly over the operating region of the vehicle. A solution to this problem is to perform the model at several different operating points and develop a family of model parameters that govern the behavior of the system 10. This family of parameters can then be applied to the calibrator's choice of tuning rule resulting in a family of PID parameters that can then be scheduled in the automotive controller. This approach can provide modest success, but usually meets with very sub-optimal performance when the vehicle is driven outside standard operating conditions.

An example of this is a vehicle traveling at 160 kph on flat ground that may request 80 kW from the fuel cell stack 12. However, the same vehicle driving up a steep grade hill pulling a trailer at 30 kph might request the same 80 kW of power from the fuel cell stack 12. The main difference between these two scenarios is that the second case has 130 kph less air traveling through the radiator 18. This significantly changes the heat rejection capability of the radiator 18. Thus, the cooling fluid control gain schedule cannot only be based on power request, but on vehicle speed. In this example, both cases assume a constant air temperature. The calibration would have to be repeated for several operating temperatures. It is easy to see that the number of cases required for calibration would be extensive. Thus, the choice is whether a limited number of calibration points results in an acceptable level of control for the entire operation of the vehicle keeping in mind that a few degrees error in the thermal control results in large variations of RH in the fuel cell stack 12. An adaptive control approach would provide on-line estimate of the system model parameters and alter the actuator output based on this information. Thus, the operating condition would be an integral part of the control.

A first-order plus dead-time model does an excellent job dynamically characterizing the thermal circuit of the fuel cell system. It can approximate the dynamics of a non-linear electrically heated wax valve thermostat and the radiator 18 for various operation conditions. However, the operating conditions will change under actual vehicle driving conditions. A fixed-gain control strategy would not perform optimally if tuned for one condition and operated under another. The only optimal solution is to adaptively change the controller parameters to meet the current operating conditions.

According to the invention, the modeling of the thermal sub-system of the system 10 is updated to reflect the current driving conditions, and the necessary control parameters are recalculated for the new condition. This solution maintains the first-order plus dead-time model form, estimates the system dead-time, estimates the new plant model parameters and uses the plant model parameters and the dead-time with the control law.

When the system dead-time is known, standard RLS is a common approach to on-line plant model parameter estimation. Estimating time-varying dead-time is the subject of much research. Some approaches over exaggerate the model order to attempt to put a bound on the possible dead-time. While this approach is certainly valid if the time delay covers a large range, this could result in a very high order model, which is not suitable for embedded control applications. The technique employed for the present invention is a comparative technique where the system dead-time is initially chosen, and with each sample the dead-time estimate is either increased, decreased or remains the same.

Converting the first-order plus dead-time plant model to a sampled-time for integration on-line gives:

$$T_{stk,out} = \frac{K \cdot e^{\theta \cdot s}}{\tau \cdot s + 1} \cdot BPV \tag{2}$$

$$T_{stk,out}(k) = a_1 \cdot T_{stk,out}(k-1) + \hat{b}_1 \cdot BPV(k-1-\hat{\theta}) \tag{3}$$

Where $T_{stk,out}$ is the temperature of the cooling fluid out of the stack 12, BPV is the position of the by-pass valve 22, K is a system gain, $\tau$ is a time constant, k is the sample number, a and b are variables and $\theta$ is the dead-time value, and where "hat" indicates an estimate of the true plant parameters. When the value $\theta$ is known, $a_1$ and $b_1$ are determined using a standard RLS algorithm.

Determining the value $\theta$ can be provided as follows. Three models are estimated, namely, a model $G_{p+}(z)$ with a time-delay greater than the current estimate of the value $\theta$, a model $G_{p-}(z)$ with a time-delay less than the current estimate of the value $\theta$ and a model $G_p(z)$ including the current estimate of the value $\theta$.

$$G_{p+}(z) = z^{-\theta} \frac{b_1 z^{-1} + b_2 z^{-2}}{A(z^{-1})} \tag{4}$$

-continued $$A(z^{-1})y(z) = b_1u(k-1-\theta) + b_2u(k-2-\theta) \quad (5)$$

$$G_p(z) = z^{-\theta}\frac{b_0 + b_1z^{-1} + b_2z^{-2}}{A(z^{-1})} \quad (6)$$

$$A(z^{-1})y(z) = b_0u(k-\theta) + b_1u(k-1-\theta) + b_2u(k-2-\theta) \quad (7)$$

$$G_{p-}(z) = z^{-\theta}\frac{b_0 + b_1z^{-1}}{A(z^{-1})} \quad (8)$$

$$A(z^{-1})y(z) = b_0u(k-\theta) + b_1u(k-1-\theta) \quad (9)$$

Where u is a by-pass valve command and y is the temperature measurement at the output of the stack 12. The $A(z^{-1})$ term represents $a_1$, while $b_1$ is determined later.

The goal is to compare $G_p$ verses $G_{p+}$ and $G_p$ verses $G_{p-}$. This is done by calculating the variance a in the two estimates. If the variance σ is too great, then the assumption is that the model dead-time should be increased or decreased to reflect the changing parameter estimate. The following series of equations show the comparison.

The error ϵ in the two estimates can be defined as:

$$\epsilon_+ = G_p(z) - G_{p+}(z) \quad (10)$$

$$\epsilon_- = G_p(z) - G_{p-} \quad (11)$$

Calculating the variances σ gives:

$$\sigma_+^2 = E[\varepsilon_+^2] = E\left[\left(\frac{z^{-\theta}b_0}{A(z^{-1})}\cdot u(z)\right)^2\right] = b_0^2\cdot E\left[\left(\frac{u(k-\theta)}{A(z^{-1})}\right)^2\right] \quad (12)$$

$$\sigma_-^2 = E[\varepsilon_-^2] = E\left[\left(\frac{z^{-\theta}b_2z^{-2}}{A(z^{-1})}\cdot u(z)\right)^2\right] = b_2^2\cdot E\left[\left(\frac{u(k-2-\theta)}{A(z^{-1})}\right)^2\right] \quad (13)$$

The ratio of the two variances σ reduces to:

$$\frac{\sigma_+^2}{\sigma_-^2} = \frac{b_0^2}{b_2^2} \quad (14)$$

Thus, by looking at the model estimate and comparing $b_0$ to $b_2$ will determine whether to increase or decrease the time delay. The comparison is done according to a selectable threshold δ as:

$$\frac{b_0^2}{b_2^2} > \delta \text{ Decrease Time-Delay Estimate} \quad (15)$$

$$\frac{b_0^2}{b_2^2} < \delta \text{ Increase Time-Delay Estimate} \quad (16)$$

With a new estimate of the value θ, the RLS algorithm can be applied to determine $a_1$ and $b_1$. It is at this point that the model estimate is complete. Now any model-based control algorithm can be applied. In one embodiment, a dead-beat control architecture is used for its quick settling time and set-point tracking properties, but any rational technique can be used, including variants or self-tuning PID controllers.

Figure 2:
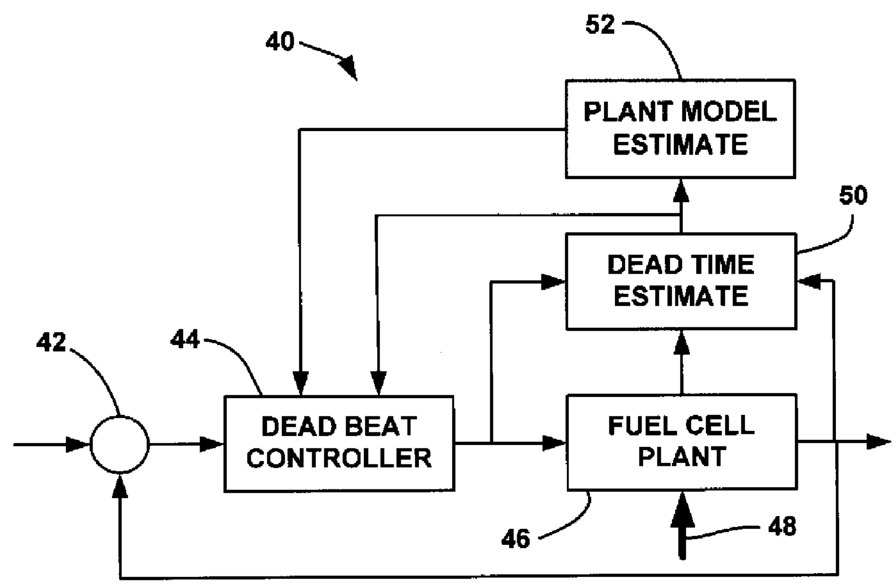
FIG. 2 is block diagram of a control architecture for controlling the position of a by-pass valve in the fuel cell system shown in FIG. 1 to control stack temperature in response to system disturbances, according to an embodiment of the present invention.

FIG. 2 is a block diagram 40 showing an operation of the RLSVDT algorithm of the invention as performed by the controller 30 to provide an estimate of the parameters discussed above. The adaptive model is provided by equation (2) to provide the input temperature of the stack 12, where the parameters a, b and θ are estimated by the algorithm. The desired temperature set-point $T_{sp}$ and the temperature $T_{stack}$ at the output of the stack 12, measured by the sensor 26, are provided to a subtractor 42 that provides a temperature error signal to a dead-beat control processor 44. The dead-beat control processor 44 is one type of control that can be used. As will be appreciated by those skilled in the art, other types of control, such as PID control, may be equally applicable.

The dead-beat control algorithm receives the variables $a_1$ and $b_1$ and the value θ, and provides control of the by-pass valve 22 to force the temperature of the cooling fluid input to the stack 12 to the temperature set-point $T_{sp}$. The command signal of the by-pass valve 22 from the processor 44 is sent to a fuel cell plant 46, defined as $G_p$, and represents the fuel cell system 10. The plant 46 receives the various disturbances on line 48, such as ambient temperature $T_{amb}$, output power of the stack 12, pump speed, fan speed, etc. An output of the plant 46 is the measured temperature $T_{stack}$ of the cooling fluid out of the stack 12, as measured by the sensor 26.

The command of the by-pass valve 22 from the processor 44 and the temperature $T_{stack}$ of the cooling fluid out of the stack 12 are provided to a dead-time estimate processor 50 that calculates the dead-time value θ as well as the variables $b_0$ and $b_2$. In one embodiment, the processor 50 uses equations (4)-(9) to determine the dead-time value θ for a series of sample periods k in order to determine whether the dead-time value θ is applicable for changing the position of the by-pass valve 22 to cause the temperature at the outlet of the stack 12 to move towards the temperature set-point $T_{sp}$. The dead-time value θ from the processor 50 is sent to a plant model estimate processor 52 that calculates the variables $a_1$ and $b_1$, using equations (17)-(23) below, which are the standard equations for a recursive least squares algorithm, as would be well understood by those skilled in the art.

$$\zeta(k+1) = \zeta(k) + \gamma(k)\cdot e(k+1) \quad (17)$$

$$\gamma(k) = \mu(k+1)\cdot P(k)\cdot\psi(k+1) \quad (18)$$

$$e(k+1) = y(k+1) - \omega^T(k+1)\cdot\zeta(k) \quad (19)$$

$$\zeta = [\hat{a}_1 \ldots \hat{a}_m \hat{b}_1 \ldots \hat{b}_m]^T \quad (20)$$

$$\psi^T(k) = [-y(k-1) \ldots -y(k-\hat{m})u(k-\hat{\theta}-1) \ldots u(k-\hat{\theta}-\hat{m})] \quad (21)$$

$$\mu(k+1) = [\lambda + \psi^T(k+1)\cdot P(k)\cdot\psi(k+1)]^{-1} \quad (22)$$

$$P(k+1) = [1-\gamma(k)\cdot\psi^T(k+1)]\cdot P(k)/\lambda \quad (23)$$

Where ζ is the to-be-identified plant parameters, $\hat{\theta}$ is the dead-time estimate from the block 50, $\psi^T$ is the matrix of the input/output data, μ is a dummy value that could be combined with γ(k), which is an estimate of the covariance matrix, where the covariance matrix is a measure of the fit, and e(k+1) is the error between the data, y(k+1) and the model prediction $\psi^T(k+1)*\theta(k)$. The value γ can also be combined with P(k+1).

The dead-beat control processor 44 calculates the control signal shown in equations (24) and (25) below, that is then used to change the position of the by-pass valve 22, which will force the temperature $T_{stack}$ of the cooling fluid out of the stack 12 to the temperature set-point $T_{sp}$.

$$u = q_0 z^{-\theta} B + q_0 A \quad (24)$$

$$q_0 = \frac{1}{\sum b_i},\ B = b,\ A = z + a \quad (25)$$

Thus, calculations of the variables $a_1$ and $b_1$ and the value θ provide estimates of the fuel cell thermal sub-system plant model subject to uncontrolled disturbances on the fuel cell system 10, which are adaptively considered by the processor 44 to alter the temperature of the fuel cell stack 12.

The process for calculating the disturbances can be summed up as follows. Input/output data is taken from the system, which in the case described above is the command for the by-pass valve 22 and the output temperature of the cooling fluid from the stack 12. A recursive least squares process is then used to fit the three model types. The models are then compared to a variance which reduces to comparing the ratio of $b_0$ and $b_2$ to a threshold, and then the dead-time value θ is determined that should increase, decrease or remain the same. The dead-time value θ is then sent to another recursive least square's algorithm to determine the parameters a and b. The parameters a, b and θ are then applied to a dead-beat algorithm. These values are the dynamics of the thermal sub-system.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:

a fuel cell stack;

a cooling fluid pump pumping a cooling fluid through the fuel cell stack;

a temperature sensor measuring the temperature of the cooling fluid out of the fuel cell stack;

a radiator for cooling the cooling fluid from the fuel cell stack before it is returned to the fuel cell stack;

a by-pass valve that selectively allows a portion of the cooling fluid to by-pass the radiator; and a controller programmed to control the position of the by-pass valve, said controller receiving a temperature signal from the temperature sensor, said controller also programmed with a dead-time plant model to calculate a plurality of variables and a dead-time value that are used to set the position of the by-pass valve so that the temperature of the cooling fluid exiting the fuel cell stack moves towards a desired temperature set-point, wherein the plurality of variables include control parameters that are recalculated for new operating conditions and wherein the recalculated control parameters are used to estimate new plant model parameters, and wherein the controller estimates a first dead-time plant model having a time delay greater than a current estimate of the dead-time value, a second dead-time plant model including a time-delay less than the current estimate of the dead-time value and a third dead-time plant model including the current estimate of the dead-time value, wherein the first dead-time plant model is compared to the third dead-time plant model and the second dead-time plant model is compared to the third dead-time plant model by calculating variances in the estimates to determine whether the dead-time value should be increased or decreased.

2. The system according to claim 1 wherein the controller uses a recursive least squares process for calculating the position of the by-pass valve.

3. The system according to claim 2 wherein the controller uses a first-order plus dead-time plant model in combination with the recursive least squares process to calculate the position of the by-pass valve.

4. The system according to claim 1 wherein a ratio of the variances is provided as a ratio of two of the variables in the plurality of variables, where the ratio of the two variables is compared to a threshold to determine whether to increase or decrease a time delay.

5. The system according to claim 1 wherein the controller sets the position of the by-pass valve using a dead-beat control.

6. The system according to claim 1 wherein the controller sets the position of the by-pass valve using a proportional-integral-derivative control.

7. The system according to claim 1 wherein the by-pass valve is an electrically-heated wax thermostat by-pass valve.

8. A fuel cell system comprising:

a fuel cell stack;

a cooling fluid pump for pumping a cooling fluid through the fuel cell stack;

a temperature sensor for measuring the temperature of the cooling fluid out of the fuel cell stack;

a radiator for cooling the cooling fluid from the fuel cell stack before it is returned to the fuel cell stack;

a by-pass valve that selectively allows a portion of the cooling fluid to by-pass the radiator; and a controller programmed to control the position of the by-pass valve in response to system disturbances so as to maintain the temperature of the fuel cell stack at or near a desired temperature set-point, said controller using a recursive least squares process and a first-order plus dead-time plant model to calculate the position of the by-pass valve, said controller also programmed to calculate a plurality of variables and a dead-time value that is increased or decreased in response to an estimate of a dead-time plant model, wherein the plurality of variables include control parameters that are recalculated for new operating conditions and wherein the recalculated control parameters are used to estimate new plant model parameters, and wherein the controller estimates a first dead-time value having a time delay greater than a current estimate of the dead-time value, a second dead-time plant model including a time-delay less than the current estimate of the dead-time value and a third dead-time plant model including the current estimate of the dead-time value, wherein the first dead-time plant model is compared to the third dead-time plant model and the second dead-time plant model is compared to the third dead-time plant model by calculating variances in the estimates to determine whether the dead-time value should be increased or decreased.

9. The system according to claim 8 wherein a ratio of the variances is provided as a ratio of two of the variables in the plurality of variables, where the ratio of the two variables is compared to a threshold to determine whether to increase or decrease a time delay.

10. The system according to claim 8 wherein the controller sets the position of the by-pass valve using a dead-beat control.

11. A method for controlling the temperature of a fuel cell stack in a fuel cell system, said method comprising:

pumping a cooling fluid through the fuel cell stack;

measuring the temperature of the cooling fluid out of the fuel cell stack;

cooling the cooling fluid from the fuel cell stack in a radiator before it is returned to the fuel cell stack; and controlling the amount of the cooling fluid that by-passes the radiator in response to system disturbances so as to maintain the temperature of the fuel cell stack at or near a desired temperature set-point, wherein controlling the amount of the cooling fluid that by-passes the radiator includes using a recursive least squares process and a first-order plus dead-time plant model and calculating a plurality of variables and a dead-time value that is increased or decreased in response to an estimate of a dead-time plant model, and further includes using estimates of a first dead-time plant model having a time delay greater than a current estimate of the dead-time value, a second dead-time plant model including a time-delay less than the current estimate of the dead-time value and a third dead-time plant model including the current estimate of the dead-time value, and comparing the first dead-time plant model to the third dead-time plant model and comparing the second dead-time plant model to the third dead-time plant model by calculating variances in the estimates to determine whether the dead-time value should be increased or decreased.

12. The method according to claim 11 wherein controlling the amount of the cooling fluid that by-passes the radiator in response to system disturbances includes providing a ratio of the variances as a ratio of two of the variables in the plurality of variables, where the ratio of the two variables is compared to a threshold to determine whether to increase or decrease a time delay.

13. The method according to claim 11 wherein controlling the amount of the cooling fluid that by-passes the radiator in response to system disturbances includes setting the position of a by-pass valve using a dead-beat control.

* * * * *